106. COMPOSITIONS, COATING OR PLASTIC.

98

Cross Reference 1,143,004 Examiner

UNITED STATES PATENT OFFICE.

CHRIST WESTERGARD, OF EVERETT, WASHINGTON, ASSIGNOR OF ONE-HALF TO GEORGE McKENZIE, OF EVERETT, WASHINGTON.

PROCESS FOR MAKING TILES, CONDUIT-PIPES, BRICKS, AND LIKE PRODUCTS.

1,143,004.  Specification of Letters Patent. Patented June 15, 1915.

No Drawing.  Application filed February 24, 1914. Serial No. 820,702.

*To all whom it may concern:*

Be it known that I, CHRIST WESTERGARD, citizen of the United States, residing at Everett, in the county of Snohomish and State of Washington, have invented a certain new and useful Improvement in Processes for Making Tiles, Conduit-Pipes, Bricks, and like Products, of which the following is a specification.

My invention relates to processes for preparing and mixing the ingredients of composite matter to adapt such composite matter to be molded to form conduit-pipes, tiles, bricks and the like building material, and for treating and curing such composite matter after it is molded into the form desired; and the objects of my invention are: first, to provide a process whereby articles of the class named may be made and be thoroughly cured for immediate use; second, to vitrify such named products to such degree as will make them impervious to moisture and resistant to the action of acids; third, to impart such characteristics to the composite matter of such named finished products as will make such composite matter of great strength, very tough, and homogeneous throughout its mass, whereby such products may withstand greater degrees of all kinds of strains irrespective of wide changes in temperature to which they may be subjected, than may like named products heretofore made.

My invention is especially designed for use in connection with compositions of matter of the class to which belongs the composition of matter described and claimed in my co-pending application for United States Letters Patent, filed June 7, 1913, under Serial No. 772,250.

My present invention consists in combining:

| | |
|---|---|
| Sand | 77 per cent. |
| Cement | 21 per cent. |
| Pulverized sulfur | 2 per cent. | which ingredients are prepared, and mixed to form a concrete mass that may be molded to form a desired product and cured in the following manner: The sand, which preferably is sharp sand, must be dry, is mixed with the cement, preferably of the best quality of Portland cement, together with the sulfur whereupon the whole mass in its dry granular or powdered state is thoroughly mixed by suitable means whereupon there is added to the mixture a sufficient quantity of soapy water to permeate thoroughly the whole mass to moisten it to produce a consistency somewhat similar to the consistency of molder's sand to adapt it to be tamped compactly into molds whereby its form may be maintained when the molded products are removed from such molds. The sand should be dry in order to absorb the soapy water when such sand is mixed with the cement and sulfur. The composite mass thus prepared is molded into the form of the desired product, preferably without delay, by feeding it continuously into a suitable mold until such mold is filled; and during the operation of filling the mold the composite matter is compactly compressed by constantly tamping it by suitable means thus to make the product dense and solid. The mold, having been thus compactly filled to form the material into the desired product, is now removed and the molded product is carried into a steam curing kiln where it is allowed to remain about twelve hours to permit the cement to set, during which twelve hours no steam is admitted to said steam curing kiln, such term of twelve hours, if it be desired for sake of convenience, may be extended even for days without the presence of steam, provided, however, the molded product be sprinkled with water at intervals of about eight hours to keep the product moist until steam for curing the product is admitted into the kiln. Thus far in the process the sulfur has not been affected and therefore it does not affect the setting of the cement. The presence of soapy water in the mixture not only serves to make the mixture plastic and more cohesive but in the operation of steam curing to which the product is now to be subjected such soapy water serves to prevent the ignition of the sulfur while it is subjected to a temperature much higher than the temperature of its melting point when subjected to the presence of steam having a very high degree of temperature.

When the molded product is not to be used for fire proof construction or when it is not required to be of fine texture, common water may be used instead of soapy water.

The molded product having been disposed within the kiln and maintained in its moist condition for a period of twelve hours or more, as explained, the kiln is closed to be as nearly steam tight as possible whereupon live steam, direct from the boiler, is admitted into the kiln to raise the temperature of the product to be from one hundred to one hundred and eight degrees Fahrenheit, and such temperature is to be maintained for about three hours or until the product is evenly heated to such temperature throughout its entire mass, whereupon the temperature is increased to be two hundred and twelve degrees or more by admitting more steam or hotter steam into the kiln, which higher temperature is to be maintained for one hour, at the end of which time the product will be cured and then the kiln may be opened and the product removed for immediate use.

During the first three hours from the time when steam is first admitted into the kiln the product will have been thoroughly wetted by the condensation of steam but the sulfur embodied within the product will not have been affected by the temperature to which the product has been subjected during such period of the three hours though the product will have acquired a yellowish color. The increased temperature during the succeeding hour will cause the cement to grow harder and harder and the sulfur will melt thoroughly to permeate the entire mass to act as a binder of great strength and thus cause all the ingredients to cohere and be vitrified to a high degree whereby the product will be homogeneous and of great density and will possess strength to resist all kinds of strains to a remarkable degree, as, for instance, it has been demonstrated by actual tests made in the laboratory of the University of the State of Washington, in which tests a brick whose cross-section was four inches square withstood a crushing strain of 5,950, lbs. per square inch.

The presence of sulfur in the composite product not only serves thoroughly to vitrify and strengthen the structure but it also serves to make the product resistant to acids.

If desired, for any reason, the relative proportions of sand and cement may be different from the proportions hereinbefore named but the relative proportions of the cement and sulfur preferably may not be different from such hereinbefore named proportions.

Obviously, if the product be of great length, breadth, and thickness, to give it great mass, then in such case, it should be subjected to the temperature of from one hundred to one hundred and eight degrees Fahrenheit, for a longer period of time than three hours in order that such temperature may be distributed evenly throughout the mass, but comparatively light or thin products, like conduit-pipe, brick, and tile need not be subjected to such temperature for a longer time than three hours.

The step in my process comprising the operation of steam curing of molded products within the kiln may be successfully employed in connection with molded products wherein the combination of ingredients hereinbefore named is changed, as for instance, lime may be substituted for cement, and other earthy materials may be substituted for sand and the proportions of such different ingredients may be changed but in all such cases sulfur must be present to constitute approximately two per cent. of the whole combination.

What I claim is:

1. The process of making and curing artificial stone consisting in mixing sand, cement and pulverized sulfur with soapy water, and molding the mass into desired shapes, then placing the articles to set for a pre-determined period during which time the same are suitably moistened, then inclosing the articles in a steam-tight kiln and admitting steam at about 108° F., for a pre-determined period, and then increasing the steam temperature to a point above 212° F., for a pre-determined period.

2. The process of making and curing artificial stone consisting in mixing sand, cement, sulfur and soapy water, and molding the mass into articles of desired shapes, then placing the molded articles in a kiln for a period of about twelve hours during which time the same are sprayed with a fluid to prevent abrupt induration, then making the kiln steam-tight and admitting steam at a temperature of about 108° F., for a period of about three hours, and then increasing the temperature of the steam to about 212° F., for a period of about one hour.

3. The process of making and curing artificial stone consisting in mixing sand, cement, a binder and water, and then molding the mass into desired shapes or forms, then placing the molded articles to set for a period of time, then moistening the articles at desired intervals, then subjecting the articles to steam heat at low temperature to permit the same to be gradually and uniformly heated throughout and then increasing the steam temperature for a desired period to complete induration.

4. The process of making and curing artificial stone consisting in mixing sand, cement, a binder and soapy water, and molding the same into articles of desired shapes, then placing the molded articles to dry at atmospheric temperature for a period of twelve hours, then spraying liquid at desired intervals on the articles during the initial drying step, then subjecting the articles to steam heat at 108° F., and then increasing the steam heat above 212° F., for a period of one hour.

In witness whereof, I, hereunto subscribe my name this 14th day of February A. D., 1914.

CHRIST WESTERGARD.

Witnesses:
  FRANK WARREN,
  F. C. MATHENY.

Copies of this patent may be obtained for five cents each, by addressing the "Commissioner of Patents, Washington, D. C."